United States Patent Office 3,553,234
Patented Jan. 5, 1971

3,553,234
DIBENZO[d,g][1,3]DIOXOCIN-6-CARBOXYLIC
ACIDS, ESTERS AND SALTS
Robert G. Johnson and Robert W. Fleming, Cincinnati, Ohio, David L. Wenstrup, Covington, Ky., and Takashi Kariya, Cincinnati, Ohio, assignors to Richardson-Merrell Inc., New York, N.Y., a corporation of Delaware
No Drawing. Filed June 18, 1969, Ser. No. 834,554
Int. Cl. C07d 21/00
U.S. Cl. 260—340.3                                  7 Claims

ABSTRACT OF THE DISCLOSURE

Dibenzo[d,g][1,3]dioxocin-6-carboxylic acids, esters, and salts which are new compounds, reduce blood lipids, particularly lipoproteins containing cholesterol and triglycerides, in warm-blooded animals when administered orally.

This invention relates to new and useful chemical compounds. More particularly, it relates to 12H-dibenzo[d,g][1,3]dioxocin-6-carboxylic acids and esters of the formula

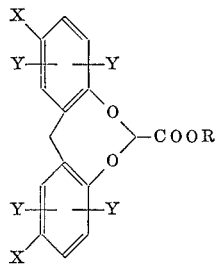

wherein X and Y are hydrogen or a halogen and R is hydrogen or lower lakyl; and pharmaceutically acceptable salts of the above acids with organic or inorganic bases. The term lower alkyl used hereinabove refers to alkyl groups of from 1 to 4 carbon atoms. The halogen referred to hereinabove includes fluorine, chlorine, bromine or iodine; the preferred halogen is chlorine. Illustrative of a compound of the above formula is: methyl 2,10-dichloro-12H-dibenzo[d,g][1,3]dioxocin-6-carboxylate.

The compounds of this invention reduce blood lipids, particularly lipoproteins containing cholesterol and triglycerides in warm-blooded animals and are useful in the treatment of hyperlipidemic states such as are encountered in patients with cardiovascular diseases, especially atherosclerotic diseases that can result in coronary heart disease and stroke. Cardiovascular diseases have been the leading cause of death in the United States in recent years. Mortality statistics show that of the various cardiovascular diseases, atherosclerotic processes occurring in the coronary or cerebral vessels are responsible for a large majority of deaths. A strong correlation exists between elevated plasma cholesterol and triglyceride levels and the development of atherosclerotic disease. Accordingly, it is considered desirable to reduce plasma cholesterol and triglyceride levels toward normal in treating diseases characterized by elevated blood lipid levels, e.g., coronary heart disease and stroke.

The compounds of this invention can be prepared by reaction of salts of a 2,2'-methylenebisphenol, for example, 2,2'-methylenebis-(4-chlorophenol), with a dihaloacetic acid, such as, for instance, dichloroacetic acid, its salts or lower alkyl esters thereof, in a suitable solvent. The reactants are used in equimolar amounts.

The required salts of the bisphenol and dihaloacetic acid can be prepared in situ by addition of base. A variety of bases can be used such as, for instance, potassium or sodium or lithium carbonate or hydroxide, calcium hydroxide, or when non-aqueous solvents are employed, such bases as alkali metals, alkali hydrides, amides or alcoholates and others.

A convenient solvent was found to be water and in this case the use of dihaloacetic acids is preferred. When non-aqueous solvents are used, dihaloacetic acid esters are preferred as reactants. Suitable non-aqueous solvents are aromatic hydrocarbons such as benzene, toluene, xylene, etc., alcohols, such as methanol, ethanol, etc., or amides, such as dimethylformamide, dimethylacetamide, etc. A preferred non-aqueous solvent is dimethylformamide.

The reaction temperature can range from room temperature to the boiling point of the solvent. When water is used as solvent, temperatures of above 60° C. are required and the boiling temperature of 100° C. is preferred. In some non-aqueous solvents, such as, for instance, dimethylformamide, lower reaction temperatures can be used—for instance, room temperature of 25° C. The reaction time can vary from 2 hours to 3 days; the preferred reaction time is 7–48 hours.

The esters of the compounds of this invention can be prepared either directly by using dihaloacetic acid esters in the reaction described above, or by converting the acids of the compounds of this invention to the esters by methods well known to the art.

EXAMPLE 1

Preparation of 2,10-dichloro-12H-dibenzo[d,g][1,3]dioxocin-6-carboxylic acid

To a hot solution of 13.5 g. (0.05 mole) of 2,2'-methylenebis-(4-chlorophenol) and 20.7 g. (0.15 mole) of potassium carbonate in 100 ml. of water was added 6.5 g. (0.05 mole) of dichloroacetic acid. The reaction mixture was refluxed for 15 hours. The solution was cooled in an ice bath and the precipitate which formed was collected and slurried in 2 N HCl for several hours. The product was collected, washed with water, and air dried, 6.8 g., M.P. 205–212° C. After two recrystallizations from ethyl acetate, 0.6 g. (3.7%) of hemihydrate was obtained, M.P. 241.0–246.5° C.

A second sample was prepared by following the above procedure with doubled amounts of starting materials. After drying at 100°/0.1 mm. for 16 hours, 4.5 g. (13.8%) of product was obtained, M.P. 242–6° C.

Analysis.—Calcd. for $C_{15}H_{10}Cl_2O_4$ (percent): C, 55.41; H, 3.10. Found (percent): C, 55.32; H, 3.19.

EXAMPLE 2

Preparation of methyl 2,10-dichloro-12H-dibenzo[d,g][1,3]-dioxocin-6-carboxylate The crude product of Example 1 was suspended in 100 ml. of methanol, 1 ml. of concentrated sulfuric acid was added carefully and the mixture was heated to reflux and stirred for one hour. A heavy precipitate resulted that was collected and recrystallized by dissolution in acetone and gradual replacement of the boiling solvent by methanol. A product of M.P. 215–216° C. was obtained that analyzed correctly and had spectral properties in agreement with the assigned structure.

EXAMPLE 3

Preparation of methyl 12H-dibenzo[d,g][1,3]-dioxocin-6-carboxylate

To a suspension of 20 g. of 2,2'-methylenebisphenol and 14.8 g. of lithium carbonate in 200 ml. of dimethylformamide stirred at 100° was added 28.6 g. of methyl dichloroacetate in two portions, one hour apart. The mixture was stirred at 100° for a total of 4 hours, was allowed to cool, and was poured into 800 ml. of water.

The product was extracted several times with hexane, the extract was washed with 1 N sodium hydroxide solution, dried and freed of solvent. It was recrystallized twice from mixtures of ether and hexane, 0.8 g. (3% yield) M.P. 108–109° C.

*Analysis.*—Calc'd for $C_{16}H_{14}O_4$ (percent): C, 71.10; H, 5.22. Found (percent): C, 71.20; H, 5.28.

EXAMPLE 4

Preparation of ethyl 2,10-dichloro-12H-dibenzo-[d,g][1,3]-dioxocin-6-carboxylate This compound was prepared by the procedure described in Example 3 using 2,2′-methylenebis(4-chlorophenol) and ethyl dibromoacetate as starting material. It was obtained in 8.5% yield, M.P. 167–168° C., analyzed correctly and had spectral properties in agreement with its structure.

EXAMPLE 5

Preparation of ethyl 1,2,4,8,10,11-hexachloro-12H-dibenzo[d,g][1,3]dioxocin-6-carboxylate The mono-potassium salt of 2,2-methylenebis(3,4,6-trichlorophenol) was prepared by slurrying 20.3 g. of the bisphenol and 8.0 g. of potassium carbonate in 200 ml. of water for several hours with warming. It was collected by filtration, and thoroughly dried, and dissolved in 200 ml. of dimethylformamide at 65° to which 12.3 g. of ethyl dibromoacetate was added. After 4 hours the temperature was raised to 100° and 2.1 g. of 60% sodium hydride in mineral oil suspension was added in small portions. After 16 hours at 100°, the reaction mixture was allowed to cool, was acidified by addition of 2 N hydrochloric acid, and the product was extracted into ether and dried. The product was recrystallized from ether-hexane, ether, and methylene chloride-ether, 1.1 g. (4.5% yield), M.P. 172–175° C.

*Analysis.*—Calc'd for $C_{17}H_{10}O_4Cl_6$ (percent): C, 41.59; H, 2.05; Cl, 43.32. Found (percent): C, 41.75; H, 2.19; Cl, 42.80. Spectral properties were in agreement with the assigned structure.

EXAMPLE 6

Hypolipidemic activity of 2,10-dichloro-12H-dibenzo-[d,g][1,3]-dioxocin-6-carboxylic acid in young rats Young male rats of the Wistar strain weighing initially about 170 grams were given free access to a diet to which the indicated amount of test compound was added. This diet was prepared by pouring an ethanolic solution of the compound over commercial Purina [1] Lab Chow and mixing thoroughly allowing the solvent to evaporate. Groups of animals were given these diets for a period of 11 days. A control group was given the same diet with no added drug. At the end of the treatment period, all rats were bled by cardiac puncture and the plasma was analyzed for cholesterol and triglyceride content on a Technicon Auto Analyzer.[2] The results are given in Table I.

[1] Ralston Purina Company, St. Louis, Mo.
[2] Technicon Corporation, Tarrytown, N.Y. 10591.

TABLE I

| Daily dose drug | | Plasma cholesterol | | Plasma triglyceride | |
| --- | --- | --- | --- | --- | --- |
| Administered, percent in diet | Consumed, mg./kg.[a] | Mg./100 ml.[b] | Percent reduction | Mg./100 ml. | Percent reduction |
| 0.005 | 4.8 | 60.1±3.0 | 7.7 | 37.1±4.3 | 62.3 |
| 0.025 | 26.5 | 53.5±2.3 | 17.8 | 34.5±6.5 | 65.0 |
| 0.10 | 89.0 | 45.9±2.6 | 29.5 | 15.6±2.1 | 84.1 |
| 0 | 0 | 65.1±2.4 | | 98.5±6.5 | |

[a] Determined by measuring food consumption.
[b] Average ± standard error of the mean.

Other compounds having the structural formula indicated at the beginning of the specification also have hypolipidemic activity. The preferred dosage is by oral administration, although parenteral routes of administration are not precluded.

What is claimed is:

1. A compound of the formula

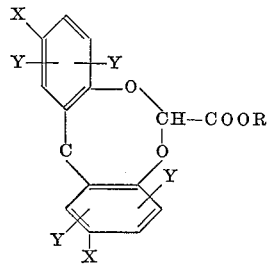

wherein: X and Y are hydrogen or a halogen and R is hydrogen or lower alkyl; and pharmaceutically acceptable salts of the acids.

2. A compound of claim 1 wherein X is halogen; Y is hydrogen; and R is hydrogen or lower alkyl.

3. A compound of claim 1 wherein X is chlorine; Y is halogen; and R is hydrogen.

4. A compound of claim 1 wherein X is chlorine; Y is hydrogen; and R is lower alkyl.

5. 2,10 - dichloro - 12H-dibenzo[d,g][1,3]dioxocin-6-carboxylate, methyl ester.

6. 2,10 - dichloro - 12H-dibenzo[d,g][1,3]dioxocin-6-carboxylate, ethyl ester.

7. 2,10 - dichloro - 12H-dibenzo[d,g][1,3]dioxocin-6-carboxylic acid and pharmaceutically acceptable salts thereof.

References Cited

UNITED STATES PATENTS 2,719,852  10/1955  Retter _____ 260—340.3

ALEX MAZEL, Primary Examiner

J. H. TURNIPSEED, Assistant Examiner

U.S. Cl. X.R.

424—278